(12) United States Patent
Schmid et al.

(10) Patent No.: US 7,462,673 B2
(45) Date of Patent: Dec. 9, 2008

(54) METHOD FOR PRODUCING AQUEOUS POLYMER DISPERSIONS

(75) Inventors: Markus Schmid, Deidesheim (DE); Mubarik Mahmood Chowdhry, Strasbourg (DE); Peter Preishuber-Pfluegl, Ludwigshafen (DE); Xavier Sava, Mannheim (DE); Ekkehard Lindner, Tuebingen (DE); Mahmoud Sunjuk, Tuebingen (DE); Peter Wegner, Tuebingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 390 days.

(21) Appl. No.: 10/556,605

(22) PCT Filed: May 6, 2004

(86) PCT No.: PCT/EP2004/004815

§ 371 (c)(1),
(2), (4) Date: Nov. 14, 2005

(87) PCT Pub. No.: WO2004/101632

PCT Pub. Date: Nov. 25, 2004

(65) Prior Publication Data

US 2007/0055011 A1    Mar. 8, 2007

(30) Foreign Application Priority Data

May 16, 2003    (DE) .................. 103 22 466

(51) Int. Cl.
C08F 4/26    (2006.01)
(52) U.S. Cl. .................. 526/93; 526/352; 502/152
(58) Field of Classification Search .......... 526/352, 526/93; 502/152
See application file for complete search history.

(56) References Cited

U.S. PATENT DOCUMENTS

| | | | |
|---|---|---|---|
| 5,401,582 A | 3/1995 | Weyland et al. | |
| 6,114,479 A * | 9/2000 | Speca et al. | 526/147 |
| 6,669,835 B1 * | 12/2003 | Honnick | 205/317 |
| 6,812,305 B2 | 11/2004 | Kristen et al. | |
| 6,852,662 B2 | 2/2005 | Queisser et al. | |
| 7,129,292 B1 * | 10/2006 | Kristen et al. | 524/804 |
| 2004/0030040 A1 | 2/2004 | Schmid et al. | |

FOREIGN PATENT DOCUMENTS

| DE | 23 31 921 | 1/1975 |
|---|---|---|
| DE | 29 23 206 | 12/1980 |
| DE | 33 45 785 | 6/1985 |
| DE | 40 03 422 | 8/1991 |
| DE | 198 29 520 | 1/2000 |
| DE | 198 59 191 | 6/2000 |
| DE | 199 17 920 | 10/2000 |
| DE | 100 17 660 | 10/2001 |
| DE | 100 61 877 | 6/2002 |
| DE | 101 18 633 | 10/2002 |
| WO | 00 20464 | 4/2000 |
| WO | 00 63277 | 10/2000 |
| WO | 01 44325 | 6/2001 |
| WO | WO 01/44325 A1 * | 6/2001 |

OTHER PUBLICATIONS

Held et al., Macromolecules, 35, 3342-3347(2002).*
U.S. Appl. No. 10/558,743, filed Dec. 1, 2005, Schmid et al.
U.S. Appl. No. 10/556,605, filed Nov. 14, 2005, Schmid et al.
U.S. Appl. No. 07/651,602, filed Feb. 6, 1991, Weyland et al.
U.S. Appl. No. 08/011,099, filed Jan. 29, 1993, Weyland et al.
U.S. Appl. No. 10/168,113, filed Jun. 17, 2002, Kristen et al.
U.S. Appl. No. 09/959,159.
U.S. Appl. No. 09/719,975, filed Dec. 18, 2000, Queisser et al.
"Latices", Encyclopedia of Polymer Science and Engineering, vol. 8, pp. 647-677 1987.
D.C. Blackey, High Polymer Latices, vol. 1, pp. 3-65 1966.
H. Warson. The Applications of Synthetic Resin Emulsions, Chapter 5, pp. 246-278 1972.
Dieterich. "Polyurethane -nach 50 Jahren immer noch jung", Chemie in unserer Zeit, vol. 24, No. 3, pp. 135-142 1990.
Leclerc et al. "Alternating Ethene/Propene Copolymerization with a Metallocene Catalyst", Angew. Chem. Int. Ed., vol. 37, No. 7, pp. 922-925 1998.
Ziegler et al. "Das Muelheimer Normaldruck-Polyaethylen-Verfahren", Angewandte Chemie, vol. 67, No. 19/20, pp. 541-547 1955.
Natta et al.. "Stereospecific Catalysts for the Head-to-tail Polymerization of Propylene to a Crystalline Syndiotactic Polymer", J. Am. Chem. Soc., vol. 84, pp. 1488-1490 1962.
Sinn et al. "Ziegler-Natta Catalysis", Advances in Organometallic Chemistry, vol. 18, pp. 99-149 1980.

(Continued)

*Primary Examiner*—Ling-Siu Choi
(74) *Attorney, Agent, or Firm*—Oblon, Spivak, McClelland, Maier & Neustadt, P.C.

(57) ABSTRACT

Process for preparing an aqueous polymer dispersion by polymerization of at least one olefinically unsaturated compound in an aqueous medium in the presence of at least one dispersant and a solid polymerization catalyst.

9 Claims, No Drawings

OTHER PUBLICATIONS

Bauers et al. "High Molecular Mass Polyethylene Aqueous Latexes by Catalytic Polymerization", Angew. Chem. Int. Ed., vol. 40, No. 16, pp. 3020-3022 2001.

Mecking. "Olefin Polymerization by Late Transition Metal Complexes- A Root of Ziegler Catalysts Gains New Ground", Angew. Chem. Int. Ed., vol. 40, No. 3, pp. 534-540 2001.

Held et al. "Coordination polymerization of ethylene in water by Pd(II) and Ni(II) catalysts", Chem. Commun., pp. 301-302 2000.

Tomov et al. "Emulsion Polymerization of Ethylene in Water Medium Catalysed by Organotransition Metal Complexes", Macromol. Symp., vol. 150, pp. 53-58 2000.

Held et al. "Aqueous Polyketone Latices Prepared with Water-Insoluble Palladium(II) Catalysts", Macromolecules, vol. 35, pp. 3342-3347 200.

Lindner et al. "Catalytic activity of cationic diphospalladium(II) complexes in the alkene/CO copolymerization in organic solvents and water in dependence on the length of the alkyl chain at the phosphine ligands", Journal of Organometallic Chemistry; vol. 602, pp. 173-187 2000.

Verspui et al. "Ein stabiler, bemerkenswert aktiver, wasserloeslicher Pd-Katalysator zur alternierenden Copolymerisation von Ethen und CO in Wasser", Angew. Chem., vol. 112, No. 4, pp. 825-827 2000.

Ono et al. "Stereoregular Emulsion Polymerization of Butadiene", Journal of Polymer Science: Part A: Polymer Chemistry, vol. 38, pp. 1083-1089.

Rinehart. "Polymerizations Catalyzed by Noble Metal-Olefin Complexes", J. Polymer Sci. Part C., No. 27, pp. 7-25 1969.

Mikulasova et al. "Polymerization of Styrene Initiated by Heterogeneous Macromolecular Initiator", European Polymer Journal, vol. 10, pp. 551-556 1974.

* cited by examiner

METHOD FOR PRODUCING AQUEOUS POLYMER DISPERSIONS

The present invention relates to a process for preparing an aqueous polymer dispersion by polymerization of at least one olefinically unsaturated compound (monomer) in an aqueous medium in the presence of at least one dispersant, wherein the polymerization is carried out in the presence of a solid polymerization catalyst.

The invention further relates to the aqueous polymer dispersions obtainable by the process of the present invention and also to their use as binders in adhesives, sealants, polymer-based plasters and renders, paper coating compositions and paints.

Aqueous polymer dispersions (latices) are generally known. These are fluid systems comprising polymer tangles (referred to as polymer particles) consisting of a plurality of intertwined polymer chains dispersed as disperse phase in an aqueous dispersion medium. The weight average diameter of the polymer particles is frequently in the range from 10 to 5000 nm.

Like polymerization solutions when the solvent is evaporated, aqueous polymerization dispersions have the potential of forming polymer films on evaporation of the aqueous dispersion medium, which is why they are employed, in particular, as binders. Owing to their environmentally friendly properties, they are gaining increasing importance.

The preparation of aqueous polymer dispersions is frequently carried out by free-radical-initiated aqueous emulsion polymerization [cf. for example, Encyclopedia of Polymer Science and Engineering, Vol. 8, page 659 ff. (1987); D.C. Blackley, in High Polymer Latices, Vol. 1, page 35 ff. (1966); H. Warson, The Applications of Synthetic Resin Emulsions, page 246 ff., chapter 5 (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin 1969]. In this process, free-radical initiators are used as polymerization "catalysts" and polar monomers are generally used as main monomers.

In addition, there are many known polymerization catalysts whose polymerizing action is based not on formation of free radicals but on monomer insertion. Nonpolar monomers are particularly suitable for these polymerization processes. If they are used at all, polar monomers are used to only a minor extent for modifying the polymer properties. The polymerization catalysts used for these polymerization processes are, in particular, catalytically active transition metal complexes or transition metal complexes in combination with compounds, known as activators, which activate the transition metal complexes. Owing to the generally high sensitivity of the transition metal complexes or transition metal complex/activator combinations to hydrolysis, these polymerization reactions are usually carried out in the form of a bulk polymerization in which the monomer is simultaneously reactant and solvent or in the form of a solution polymerization in which the transition metal complex or the transition metal complex/activator combination, the monomer and the polymer formed are all present in solution in a nonaqueous frequently aprotic organic solvent. For the purposes of the present text, these transition metal complexes or transition metal complex/activator combinations homogeneously dissolved in the monomer, solvent or generally in the polymerization medium are referred to as "homogeneous polymerization catalysts". Examples of references which may be consulted on this subject are DE-A 10017660, DE-A 10118633, Leclerc et al., Angew. Chem., Int. Ed. Engl. 1998, 37, pages 922ff., Ziegler et al., Angew. Chem., 1955, 67, pages 541ff., Natta, J. Am. Chem. Soc. 1962, 84, pages 1488ff. and Sinn and Kaminsky, Adv. Organomet. Chem. 1980,18, pages 99ff.

There have recently been an increasing number of reports on the polymerization of monomers by monomer insertion in an aqueous medium using hydrolysis-stable transition metal complexes or transition metal complex/activator combinations. Examples which may be mentioned are the papers by Mecking, Angew. Chem. Int. Ed. 2001, 40, pages 534 to 540, Bauers and Mecking, Angew. Chem. Int. Ed. 2001, 40, pages 3020 to 3022, Mecking et al. Chem. Commun. 2000, pages 301 and 302, Spitz et al., Macromol. Symp. 2000, 150, pages 53ff. and also the patent publications WO 01/44325, WO 00/20464, DE-A 2923206 and DE-A 3345785.

The polymerization of monomers together with carbon monoxide in an aqueous medium via monomer insertion using hydrolysis-stable transition metal complexes or transition metal complex/activator combinations is also known. Examples may be found in Held et al., Macromolecules 2002, 35, pages 3342 to 3347, Lindner et al., J. Organomet. Chem. 2000, 602, pages 173ff., Sheldon et al., Angew. Chem. 2000, 112, pages 825ff. and also in the patent publications WO 00/63277, DE-A 19829520, DE-A 19829520, DE-A 19917920 and DE-A 10061877.

In addition, conjugated dienes such as butadiene can also be polymerized by an insertion mechanism in an aqueous medium using hydrolysis-stable transition metal complexes or transition metal complex/activator combinations [cf., for example, Ono and Kato, J. Polym. Sci. A. 2000, 38, pages 1083 to 1089, Rinehart, J. Polym. Sci. C. 1969, 27, pages 7 to 25, and also DE-A 2332921].

Furthermore, DE-A 19859191 discloses the ring-opening polymerization of cyclic olefins in an aqueous medium using hydrolysis-stable transition metal complexes or transition metal complex/activator combinations.

A disadvantage of these "non-free-radical" polymerization processes is that the transition metal complexes used as polymerization catalysts, which are frequently expensive noble metal compounds, remain molecularly dissolved in the aqueous polymer dispersion and can thus only be used once. In addition, the transition metal complexes remaining in the aqueous polymer dispersions can interfere in later use, for example in polymer film formation, or contribute to discoloration of the polymer films formed.

It is an object of the present invention to provide a process for preparing aqueous polymer dispersions in which no free-radical or molecularly dissolved polymerization catalysts are used for the polymerization of olefinically unsaturated compounds and in which the polymerization catalysts can be separated from the aqueous polymer dispersion in a simple fashion subsequent to the polymerization.

We have found that this object is achieved by the process defined at the outset.

Suitable solid polymerization catalysts are in principle all solid polymerization catalysts which are able to trigger and maintain a polymerization reaction of olefinically unsaturated compounds in an aqueous medium. For the present purposes, solid polymerization catalysts are polymerization catalysts which have a solubility of $\leq 0.1\%$ by weight, frequently $\leq 0.05\%$ by weight and often $\leq 0.01\%$ by weight, in deionized water at 20° C.

The solid polymerization catalysts can in principle have any shape and size, for example they can be in the form of cylinders, rings, spheres, hollow bodies, gauzes, woven meshes or amorphous particles. The solid polymerization catalysts are frequently in the form of amorphous and/or porous particles having a mean particle diameter in the range from 1 μm to 10 cm, often in the range from 10 μm to 1 cm or in the range from 30 μm to 1000 μm.

For the purposes of the present invention, possible ethylenically unsaturated compounds (monomers) include both pure ethylenically unsaturated hydrocarbon compounds and heteroatom-containing α-olefins, e.g. (meth)acrylic esters and homoallyl or allyl alcohols, ethers or halides. Pure ethylenically unsaturated hydrocarbons which are useful are $C_2$-$C_{20}$-1-alkenes. Among these, particular mention may be made of low molecular weight alkenes, for example ethene, and α-alkenes having from 3 to 20 carbon atoms, e.g. propene, 1-butene, 1-pentene, 1-hexene, 1-heptene, 1-octene. Of course, it is also possible to use cyclic olefins such as cyclopentene, cyclohexene or norbornene, conjugated dienes such as 1,3-butadiene (butadiene), 2-chlorobutadiene, 2-methylbutadiene or 2,3-dimethylbutadiene, aromatic olefin compounds such as styrene, α-methylstyrene or ortho-, meta- or para-vinyltoluene and vinyl esters such as vinyl acetate or vinyl propionate. However, $C_2$-$C_{20}$-1-alkenes are particularly suitable. Among these, particular mention may be made of ethene, propene, 1-butene, 1-pentene, 1-hexene and 1-octene and also 1-decene, 1-dodecene, 1-tetradecene, 1-hexadecene and 1-octadecene, and olefin fractions from a cracker in which these are present. Of course, it is possible according to the present invention to use the above-mentioned monomers either individually or as mixtures. The monomers mentioned generally constitute the main monomers which make up a proportion of >50% by weight, in particular ≧80% by weight or ≧90% by weight, of the total amount of monomers. The monomer mixture to be polymerized frequently consists of 100% by weight of at least one of the abovementioned monomers.

However, it is also possible to use the abovementioned monomers in admixture with ethylenically unsaturated compounds which contain at least one amide group, an acid group and/or an anion thereof as structural element. Mention may be made by way of example of α,β-monoethylenically unsaturated monocarboxylic and dicarboxylic acids and their amides, e.g. acrylic acid, methacrylic acid, maleic acid, fumaric acid, itaconic acid, acrylamide, methacrylamide, also vinylsulfonic acid, 2-acrylamido-2-methylpropanesulfonic acid, styrenesulfonic acid, 10-undecenoic acid, 3-butenoic acid, 4-pentenoic acid, 5-hexenoic acid and their alkali metal and ammonium salts. The monomers containing amide or acid groups are normally present only as modifying monomers in amounts of from ≦50% by weight, ≦10% by weight, preferably ≦5% by weight, in each case based on the total amount of monomers.

The process of the present invention is carried out using at least one dispersant which keeps the polymer particles formed during the polymerization dispersed in the aqueous phase and thus ensures the stability of the aqueous polymer dispersion produced. Frequently, particularly when the respective solid polymerization catalyst is very finely divided, for example has a particle size of from 1 to 10 μm, the solid polymerization catalyst particles are also kept dispersed in the aqueous phase. As dispersant, it is possible to use both protective colloids and emulsifiers.

Suitable protective colloids are, for example, polyvinyl alcohols, polyalkylene glycols, alkali metal salts of polyacrylic acids and polymethacrylic acids, cellulose, starch and gelatin derivatives or copolymers comprising acrylic acid, methacrylic acid, maleic anhydride, 2-acrylamido-2-methylpropanesulfonic acid and/or 4-styrenesulfonic acid and alkali metal salts thereof and also homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, and acrylates, methacrylates, acrylamides and/or methacrylamides bearing amine groups. A comprehensive description of further suitable protective colloids may be found in Houben-Weyl, Methoden der organischen Chemie, volume XIV/1, Makromolekulare Stoffe, Georg-Thieme-Verlag, Stuttgart, 1961, pages 411 to 420.

It is of course also possible to use mixtures of emulsifiers and/or protective colloids. The dispersants used are frequently exclusively emulsifiers whose relative molecular weights are, unlike the protective colloids, usually below 1500. They can be either anionic, cationic or nonionic in nature. If mixtures of surface-active substances are used, it is self-evident that the individual components have to be compatible with one another, which in the case of doubt can be checked by means of a few preliminary tests. In general, anionic emulsifiers are compatible with one another and with nonionic emulsifiers. The same applies to cationic emulsifiers, while anionic and cationic emulsifiers are usually not compatible with one another. An overview of suitable emulsifiers may be found in Houben-Weyl, Methoden der organischen Chemie, volume XIV/1, Makromolekulare Stoffe, Georg-Thieme-Verlag, Stuttgart, 1961, pages 192 to 208.

Nonionic emulsifiers which can be used are, for example, ethoxylated monoalkylphenols, dialkylphenols and trialkylphenols (EO units: 3 to 50, alkyl radical: $C_4$ to $C_{12}$) and ethoxylated fatty alcohols (EO units: 3 to 80; alkyl radical: $C_8$ to $C_{36}$). Examples of such emulsifiers are the Lutensol® A grades ($C_{12}C_{14}$-fatty alcohol ethoxylates, EO units: 3 to 8), Lutensol® AO grades ($C_{13}C_{15}$ oxo alcohol ethoxylates, EO units: 3 to 30), Lutensole AT grades ($C_{16}C_{18}$ fatty alcohol ethoxylates, EO units: 11 to 80), Lutensol® ON grades ($C_{10}$ oxo alcohol ethoxylates, EO units: 3 to 11) and the Lutensol® TO grades ($C_{13}$ OXO alcohol ethoxylates, EO units: 3 to 20) from BASF AG.

Customary anionic emulsifiers are, for example, alkali metal and ammonium salts of alkyl sulfates (alkyl radical: $C_8$ to $C_{12}$), of sulfuric monoesters of ethoxylated alkanols (EO units: 4 to 50, alkyl radical: $C_{12}$ to $C_{18}$) and ethoxylated alkylphenols (EO units: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Further anionic emulsifiers which have been found to be useful are compounds of the formula I

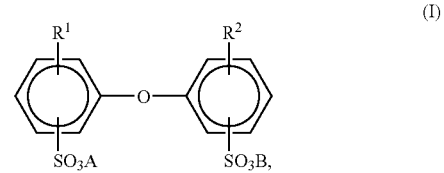

where $R^1$ and $R^2$ are each H atoms or $C_4$-$C_{24}$-alkyl and are not both H atoms, and A and B can be alkali metal ions and/or ammonium ions. In the formula I, $R^1$ and $R^2$ are preferably linear or branched alkyl radicals having from 6 to 18 carbon atoms, in particular 6, 12 or 16 carbon atoms, or H, with $R^1$ and $R^2$ not both being H atoms. A and B are preferably sodium, potassium or ammonium, particularly preferably sodium. Compounds I in which A and B are each sodium, $R^1$ is a branched alkyl radical having 12 carbon atoms and $R^2$ is an H atom or $R^1$ are particularly advantageous. Use is frequently made of industrial mixtures having a proportion of from 50 to 90% by weight of the monoalkylated product, for example Dowfax® 2A1 (trade name Dow Chemical Company). The compounds I are generally known, e.g. from U.S. Pat. No. 4,269,749, and are commercially available.

Suitable cation-active emulsifiers are, as a rule, primary, secondary, tertiary or quaternary ammonium salts bearing a $C_6$-$C_{18}$-alkyl, $C_6$-$C_{18}$-aralkyl or a heterocyclic radical, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts. Examples which may be mentioned are dodecylammonium acetate or the corresponding hydrochloride, the chlorides or acetates of the various 2-(N,N,N-trimethylammonium) ethylparaffinic esters, N-cetylpyridinium chloride, N-laurylpyridinium sulfate and N-cetyl-N,N,N-trimethylammonium bromide, N-dodecyl-N,N,N-trimethylammonium bromide, N-octyl-N,N,N-trimethylammonium bromide, N,N-distearyl-N,N-dimethylammonium chloride and also the gemini surfactant N,N'-(lauryldimethyl)ethylenediamine dibromide. Numerous further examples may be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989.

However, nonionic and/or anionic emulsifiers are particularly useful.

In general, use is made of a total of from 0.05 to 10 parts by weight, frequently from 0.1 to 7 parts by weight and often from 1 to 5 parts by weight, of dispersant, in each case based on 100 parts by weight of aqueous medium made up of the amounts of deionized water and the dispersant or dispersants.

As solid polymerization catalyst, use is frequently made of a support material impregnated or treated with a homogeneous polymerization catalyst.

Support materials which come into question are generally inert and themselves have no polymerization-catalyzing action. They can be either organic or inorganic in nature.

Materials which are in particulate form are suitable as organic supports. Activated carbon, cellulose, dextran, dextrose or organic polymers or copolymers are all possible. Examples of polymers and copolymers are polyolefins such as polyethylene, polypropylene, poly-1-butene and polymethyl-1-pentene and copolymers of monomers on which these polymers are based, also polyesters, polyamides, polyvinyl chloride, polyacrylates and polymethacrylates and polystyrene. Further suitable support materials are copolymers, in particular ternary copolymers, of carbon monoxide and olefinically unsaturated compounds such as ethene, propene or 1-butene, for example carbon monoxide-ethene-propene or carbon monoxide-ethene-1-butene terpolymers. The organic support materials which can be used are generally employed as dried polymer powders whose particles preferably have a size in the range from 5 to 300 μm, often in the range from 10 to 150 μm or in the range from 30 to 80 μm. The polymeric support systems can be prepared by generally known methods.

Possible inorganic supports are materials such as silica gel, oxides of aluminum, magnesium, titanium, zirconium, boron, calcium or zinc, aluminosilicates, polysiloxanes, talc, sheet silicates or zeolites. Other metal compounds which are sparingly soluble in water, e.g. sparingly soluble metal salts, for example metal sulfates such as barium sulfate and metal sulfides or metal phosphates are suitable as supports. Particularly preferred supports are, for example, silica gels, preferably those of the formula $SiO_2$ a $Al_2O_3$, where a is from 0 to 2, preferably from 0 to 0.5, i.e. aluminosilicates or silicon dioxide. Suitable silicagels are granular silica gel, for example the commercial product SG 332 from Grace, silylated silica gel obtainable from conventional silica gel by treatment with trimethylchlorosilane, passivated silica gel obtainable by treating conventional silica gel with trialkylaluminums, or spherical silica gel, for example Silicagel® ES 70x from Crosfield. Polysiloxanes, e.g. the product Deloxane from Degussa, and acidic sheet silicates, e.g. the product K10 from Sudchemie, can likewise be used as support materials. It is also possible to use pyrogenic silicas, e.g. finely divided silicas which are usually prepared by flame hydrolysis of silicon tetrachloride in an $H_2/O_2$ flame. Pyrogenic silicas have a virtually pore-free surface and have a reduced number of free hydroxy groups. Particular preference is given to using silica gels, in particular spherical or granular silica gels. These silica gels generally have a mean particle diameter of from 10 to 100 μm, in particular from 30 to 80 μm. The specific surface area (BET) of the preferred silica gels is generally in the range from 50 to 1000 $m^2/g$, in particular in the range from 100 to 400 $m^2/g$, and the pore volume is from 0.5 to 5 ml/g, in particular from 1.0 to 3.5 ml/g.

The support material can be impregnated or treated with the homogeneous polymerization catalyst. For the purposes of the present text, the term "impregnated" means that the homogeneous polymerization catalyst is applied to a nonreactive, inert support material and only physical adsorptive forces exist between the support material and the homogeneous polymerization catalyst. The term "treated" means that the homogeneous polymerization catalyst is applied to a support material and chemical bonds are formed between the support material and the homogeneous polymerization catalyst. This can be achieved, for example, by modifying the functional groups on the surface of inorganic support materials, e.g. silica gels or aluminum oxides, in a targeted manner. For example, the surface behavior of silica gels or aluminum oxides can be modified in a targeted manner by treatment with halosilanes, haloboranes, aluminum alkyls or boron alkyls or mixtures thereof or with aminosilanes. Of course, intermediate forms of the abovementioned polymerization catalysts in which part of the homogeneous polymerization catalyst is chemically bound and the remainder is physically adsorbed on the solid support material are also possible.

Processes for synthesizing solid polymerization catalysts in which the homogeneous polymerization catalyst is present during the preparation of the solid support material, for example in the precipitation or subsequent work-up, and can thus be incorporated chemically into the support structure are also known to those skilled in the art (cf., for example, U.S. Pat. No. 5,567,801, WO 96/28480, EP-A 559288, EP-A 511713 or EP-A 572087 and also Lindner et al., Angew. Chem., 1999, 111, pages 2288 to 2309).

A person skilled in the art will also be familiar with the preparation of a solid polymerization catalyst comprising a solid support material which has been impregnated or treated afterwards with a homogeneous polymerization catalyst (cf., for example, U.S. Pat. No. 5,567,801, U.S. Pat. No. 5,331,083, EP-A 248483, EP-A 404228, EP-A 443687, EP-A 511713, EP-A 559288, EP-A 559289 or EP-A 722968).

The solid polymerization catalyst is prepared (cf. DE-A 19746280) by, for example, a) suspending the support material in a nonpolar aprotic liquid solvent, b) adding a homogeneous polymerization catalyst dissolved in a polar aprotic liquid solvent to the suspension from a) in a controlled manner, c) filtering the mixture obtained in b), if appropriate washing the resulting solid residue with a nonpolar aprotic liquid solvent, and d) freeing the solid polymerization catalyst obtained as solid residue of adhering solvent under reduced pressure or in a stream of inert gas, or by i) suspending the support material in a polar aprotic liquid solvent, ii) adding a homogeneous polymerization catalyst dissolved in a polar aprotic liquid solvent to the suspension from i) in a controlled manner, iii) admixing the mixture obtained in ii) with a nonpolar aprotic liquid solvent in a controlled manner, iv) filtering the mixture obtained in iii), if appropriate washing the resulting solid residue with a nonpolar aprotic liquid medium, and v) freeing the solid polymerization catalyst obtained as solid residue of adhering solvent under reduced pressure or in a stream of inert gas.

As an alternative, the support material can be suspended in the catalyst solution and the solvent can subsequently be removed under reduced pressure.

Possible nonpolar aprotic liquid solvents are, in particular, linear or branched aliphatic hydrocarbons such as n-pentane, isopentane, hexane, heptane, octane, decane, dodecane, isododecane or mixtures thereof. It is also possible to use industrial mixtures of various hydrocarbons of this type, e.g. kerosene, petroleum ether or Isopar E®. Further nonpolar aprotic liquid media which may be mentioned are cycloaliphatic solvents such as cyclohexane or norbornane. For reasons of availability, preference is given to using n-pentane.

Suitable polar aprotic liquid solvents include halogenated hydrocarbons such as dichloromethane, dichloroethane or chloroform, aromatic hydrocarbons such as benzene, toluene, ethylbenzene, xylene or chlorobenzene or aliphatic ethers such as tetrahydrofuran or any mixtures of these compounds. It is also possible to use acetonitrile or acetone as liquid polar aprotic solvent or as a component among a plurality of solvents. Preference is given to using acetone, dichloromethane, tetrahydrofuran, acetonitrile or mixtures thereof, in particular dichloromethane. It is important that the above-described liquids or liquid mixtures of differing polarity are immiscible or only very sparingly miscible with one another. This also applies in particular to the respective liquid systems containing dissolved or undissolved reaction constituents such as homogeneous polymerization catalyst or support material.

However, it is important that the homogeneous polymerization catalysts and the support materials are selected so that the homogeneous polymerization catalysts are sufficiently strongly anchored physically and/or chemically to the solid support material for them not to be leached, or to be leached to only a very minor extent, from the solid support material in the aqueous polymerization medium comprising deionized water and at least one dispersant, even under reaction conditions.

In one embodiment, the homogeneous polymerization catalyst used is a metal complex containing, as metal center, a metal of group VIIIB, IB or IIB of the Periodic Table, for example copper, silver, gold, zinc, cadmium, mercury, iron, cobalt, nickel, ruthenium, rhodium, palladium, osmium, iridium or platinum, preferably iron, cobalt, nickel, ruthenium, rhodium, palladium, osmium, iridium or platinum and particularly preferably cobalt, nickel, ruthenium or palladium. Such metal complexes are described, for example, in EP-A 121965, EP-A 743336, WO 96/23010, WO 98/42664, WO 98/42665 or WO 01/10876.

Such metal complexes frequently become active only as a result of treatment with activators. If this is the case, it is advantageous firstly to prepare the solid polymerization catalyst by impregnating and/or treating the solid support material with the homogeneous polymerization catalyst and to add the activator component to the polymerization mixture comprising deionized water, at least one dispersant and the solid polymerization catalyst only immediately before the polymerization reaction.

Suitable solid catalysts for the polymerization of monomers according to the present invention are, for example, (1,3-bis(di(n-decyl)phosphino)propane)palladium(II) acetate on silica gel, (1,3-bis(di(n-decyl)phosphino)propane)palladium(II) acetate on activated carbon or (1,3-bis(diphenylphosphino)propane)palladium(II) acetate on silica gel.

The process of the present invention can in principle also be carried out using heterogeneous polymerization catalysts. For the purposes of the present text, a heterogeneous polymerization catalyst is a solid polymerization catalyst whose solid itself consists essentially of a polymerization-catalyzing composition, as disclosed, for example, in Ziegler et al., Angew. Chem. 1955, 67, pages 541ff.

It is an important aspect of the process of the present invention for the polymerization of monomers that it can also be carried out in the presence of carbon monoxide. All the abovementioned monomers can in principle be used for this purpose. However, preference is given to using pure ethylenically unsaturated hydrocarbon compounds such as $C_2$-$C_{20}$-1-alkenes, cyclic olefins, conjugated dienes or aromatic olefin compounds or mixtures thereof. Among these, particular mention may be made of low molecular weight alkenes such as ethene or a-alkenes having from 3 to 20 carbon atoms, e.g. propene, 1-butene, 1-pentene, 1-hexene, 1-heptene, 1-octene. Examples of cyclic olefins which may be used are cyclopentene, cyclohexene and norbornene, examples of conjugated dienes are butadiene, 2-chlorobutadiene, 2-methylbutadiene and 2,3-dimethylbutadiene and examples of aromatic olefin compounds are styrene, α-methylstyrene and ortho-, meta- or para-vinyltoluene. However, $C_2$-$C_{20}$-1-alkenes are particularly useful. Among these, particular mention may be made of ethene, propene, 1-butene, 1-pentene, 1-hexene or 1-octene and also 1-decene, 1-dodecene, 1-tetradecene, 1-hexadecene and 1-octadecene and also olefin fractions from a cracker in which these are present. Of course, it is possible to use the abovementioned monomers individually or as mixtures for the purposes of the present invention. The monomers mentioned generally constitute the main monomers which make up a proportion of $\geq 50\%$ by weight, in particular $\geq 80\%$ by weight or $\geq 90\%$ by weight, of the total amount of monomers. The monomer mixture to be polymerized frequently consists of 100% by weight of at least one of the abovementioned monomers.

Reaction products obtained are aqueous polymer dispersions of polyketone compounds. The reaction conditions under which the monomers and carbon monoxide are reacted in the presence of a solid polymerization catalyst correspond essentially to the conditions under which monomers and carbon monoxide are polymerized in an aqueous medium in the presence of homogeneously dissolved polymerization catalysts. These conditions are well known to those skilled in the art (cf., for example, DE-A 10061877 or EP-A 121965).

The preparation of aqueous polyketone dispersions can be carried out using all solid polymerization catalysts which are able to initiate the formation of polyketones in an aqueous medium. These catalysts are frequently obtained by impregnating or treating a solid support material with a homogeneous hydrolysis-stable polymerization catalyst suitable for the formation of polyketones.

Examples of homogeneous, hydrolysis-stable polymerization catalysts for the preparation of polyketones may be found, for example, in Held et al., Macromolecules 2002, 35, pages 3342 to 3347, and in the patent publications WO 00/63277 and DE-A 10061877.

Furthermore, it is in principle also possible to react cyclic olefins in aqueous medium in a ring-opening polymerization reaction in the presence of appropriate solid polymerization catalysts to give aqueous polymer dispersions.

It is an important aspect of the process that it can also be carried out in the presence of $\leqq 10\%$ by weight of an organic solvent, based on the aqueous medium comprising water and dispersant. Organic solvents which can be used are polar protic or polar aprotic organic compounds having a molecular weight of $\leqq 200$ g/mol. Examples are polar aprotic organic solvents such as halogenated hydrocarbons, for example dichloromethane, dichloroethane or chloroform, aromatic hydrocarbons, for example benzene, toluene, ethylbenzene, xylene or chlorobenzene, or aliphatic ethers such as tetrahydrofuran or any mixtures of these compounds. Furthermore, acetonitrile or acetone can be used as liquid polar aprotic solvent or as a component of a plurality of such solvents. Polar protic organic solvents are, for example, $C_1$-$C_{10}$-alkanols, in particular $C_1$-$C_6$-alkanols such as methanol, ethanol, n-propanol, isopropanol, 1-butanol, 2-butanol, 2-methyl-2-propanol, and also the corresponding isomeric pentanols, hexanols or heptanols. The amount of organic solvent, based on the aqueous medium comprising water and dispersant, is often $\leqq 5\%$ by weight, or $\leqq 3\%$ by weight or $\leqq 1\%$ by weight. The polymerization reaction is frequently carried out without addition of organic solvent.

The amount of the solid polymerization catalyst used for the polymerization is dependent on its activity under the reaction conditions and can be determined by a person skilled in the art in simple preliminary tests. It is economically advantageous for the solid catalysts and the polymerization conditions to be selected so that at least 100 g of polymer are formed from the monomers per gram of solid polymerization catalyst and hour.

In respect of the use of the aqueous polymer dispersions obtainable by the polymerization process of the present invention, it is frequently advantageous for these to have a very low content of transition metal compounds [groups VIIIB, IB, IIB of the Periodic Table of the Elements]. It is accordingly advantageous for solid polymerization catalysts whose metal solubility in the aqueous medium is as low as possible to be selected for the polymerization in an aqueous medium.

If, for example, a solid support material impregnated or treated with a homogeneous polymerization catalyst is used as solid polymerization catalyst, it is advantageous to select the solid support material, the homogeneous polymerization catalyst and the way in which the homogeneous polymerization catalyst is applied so that the homogeneous polymerization catalyst is firmly anchored to the solid support material. It is particularly advantageous for the homogeneous polymerization catalyst to be sufficiently strongly bound physically and/or chemically to the solid support material for at least 90% by weight, often $\geqq 95\%$ by weight or $\geqq 98\%$ by weight, of the homogeneous catalyst, based on the total amount of homogeneous catalyst on the support material prior to the polymerization reaction, to remain on the support material after a polymerization has been carried out. This determination can, for example, be carried out by determining the amount of transition metal from the homogeneous polymerization catalyst on the solid support material before and after the polymerization reaction. As an alternative, the concentration of transition metal in the aqueous polymer dispersion can be measured.

In a preferred embodiment, the solid polymerization catalyst is used in the form of particles whose minimum diameter is at least 10 times the weight average diameter of the polymer particles formed by the polymerization. It is advantageous for the minimum diameter or the minimum particle size of the solid polymerization catalyst to differ by a factor of $\geqq 20$, $\geqq 50$ or $\geqq 100$ from the weight average diameter of the polymer particles.

The preparation of the aqueous polymer dispersion is frequently carried out with exclusion of oxygen, for example under an inert gas atmosphere such as nitrogen or argon or under a carbon monoxide or monomer atmosphere.

The polymerization temperature and polymerization pressure are strongly dependent on the activity of the solid polymerization catalyst used and the reactivity of the monomers to be reacted. The polymerization temperature can be from 0 to 200° C., or from 20 to 150° C. or from 40 to 120° C., and the polymerization pressure measured in the gas phase can be from 1 to 300 bar, or from 5 to 200 bar or from 10 to 100 bar (in each case absolute values).

The polymerization reaction of the monomers can in principle be carried out batchwise, semicontinuously or continuously, with or without seed polymer. A frequently employed procedure is to place part or all of the deionized water, of the dispersant or dispersants, of the solid polymerization catalyst or catalysts and any seed polymer in a reaction zone under an inert gas atmosphere, heat the mixture to the reaction temperature and add any remaining amount of the abovementioned components, the total amount of the monomers and, if applicable, carbon monoxide to this reaction mixture. It is also possible to add part or all of the monomers or, if applicable, carbon monoxide to the reaction mixture before it is heated to the reaction temperature. Of course, the monomers can also be introduced into the reaction mixture in the amount in which they are consumed according to the gradient mode of operation known to those skilled in the art. For the present purposes, the reaction zone is a suitable polymerization reactor such as a stirred vessel, a cascade of stirred vessels, a tube reactor or a loop reactor.

The aqueous polymer dispersions obtained have contents of polymer solids of from 0.1 to 70% by weight, from 5 to 65% by weight or from 10 to 55% by weight, in each case based on the aqueous polymer dispersion.

If the amount of solid polymerization catalyst used for the polymerization is small, the polymerization catalyst is readily available at low cost or the polymerization catalyst used does not interfere in the later use of the aqueous polymer dispersion because of the composition and size of the catalyst, then the solid polymerization catalyst can frequently be left in the aqueous polymer dispersion. This can be the case when, for example, a finely divided solid polymerization catalyst based on inorganic support materials (e.g. titanium dioxide, silicon dioxide or aluminum oxide) is used and the same inorganic materials are mixed into the appropriate formulation, for example as pigments or fillers, in the subsequent use of the aqueous polymer dispersion as binder, for example in paints, adhesives, sealants, polymer-based plasters and renders or paper coating compositions.

Since the density and/or size of the particles of the solid polymerization catalyst generally differ from the density and/or size of the polymer particles, it can, if necessary, be separated off from the resulting aqueous polymer dispersion in a simple manner by filtration or centrifugation. The appropriate process measures are known to those skilled in the art. After the solid polymerization catalyst has been separated off, the aqueous polymer dispersion obtained generally has a significantly lower content of transition metal ions than a corresponding aqueous polymer dispersion prepared via homogeneously catalyzed polymerization. These aqueous polymer dispersions, too, are very useful as binders in adhesives, sealants, polymer-based plasters and renders, paper coating compositions and paints.

The solid catalyst which has been separated off can be freed of adhering aqueous polymer dispersion by washing with deionized water and be stored in a moist or dry form, frequently under an inert gas such as nitrogen or argon, for a number of weeks or months. It is economically advantageous that this solid polymerization catalyst which has already been used can be used again for further polymerization reactions of monomers in an aqueous medium in the presence of at least one dispersant without a loss in activity, or with only a small loss in activity.

The present process makes it possible to obtain widely usable aqueous polymer dispersions on the basis of ethylenically unsaturated compounds available at very low cost. A technical advantage is that the aqueous polymer dispersions contain no transition metal ions, or only very small amounts of transition metal ions, after the solid polymerization catalysts have been separated off, and an economic advantage is that the solid polymerization catalyst can be reused a number of times.

EXAMPLES

1 Preparation of the Solid Polymerization Catalyst 1.1 Preparation of 1-(di(diethylphosphonato-3-propyl))phosphino-3-(diethylphosphonato-3-propyl-8-trimethoxyoctylphosphino)propane (1) [Synthesis Analogous to the Method of Lindner et al., J Organomet. Chem. 2000, 602]

600 mg of 1,3-diphosphinopropane were weighed into a fused silica Schlenk tube provided with a magnetic stirrer under a protective argon atmosphere, admixed at room temperature with 1.3 g of trimethoxy-7-octene and illuminated for 10 hours with a high-pressure mercury vapor lamp (700 W) while stirring. 2.9 g of diethyl allylphosphonate (99% by weight pure, Aldrich) were then added under argon and the mixture was illuminated for a further 24 hours. Unreacted starting materials were subsequently removed by evaporation at 80° C. und 1 mbar (absolute). 4.76 g of product 1 were obtained as residue, corresponding to a yield of 99% by weight.

1.2 Preparation of di(acetonitrite)(1-(di(diethylphosphonato-3-propyl))phosphino-3-(diethylphosphonato-3-propyl-8-trimethoxyoctylphosphino)propane) palladium(II) bis(tetrafluoroborate) (2)

A solution of 0.417 g of tetrakis(acetonitrile)palladium(II) tetrafluoroborate (from Strem) in 10 ml of anhydrous acetonitrile was placed in a Schlenk tube provided with a magnetic stirrer under a protective argon atmosphere, admixed at 20-25° C. (room temperature) with a solution of 0.82 g of product 1 in 5 ml of anhydrous acetonitrile and the mixture was stirred for 1 hour. The solvent was then taken off under reduced pressure (1 mbar absolute). After redissolution of the residue in 10 ml of anhydrous dichloromethane, the product 2 was precipitated by addition of 20 ml of n-hexane and, after filtration, dried under reduced pressure (cf. section 1.1 above). This gave 0.986 g of complex 2, corresponding to a yield of 96% by weight.

1.3 Preparation of a Solid Polymerization Catalyst 2.63 g of 1,8-bis[(dimethoxy)methylsilyl]octane and 0.75 g of deionized water, 30 mg of dibutyltin acetate (95% by weight pure, Aldrich) and 30 μl of methanol were added to a solution comprising 0.986 g of complex 2, 5 ml of anhydrous dichloromethane and 5 ml of anhydrous acetonitrile and the mixture was stirred for three hours at 0° C. in a Schlenk tube by means of a magnetic stirrer. A gel was formed, and this was dried under reduced pressure (down to 1 mbar absolute). The pulverulent solid obtained was washed three times with 30 ml of toluene and once again dried under reduced pressure (see section 1.1 above). This gave 1.2 g of solid pulverulent polymerization catalyst 3.

2 Polymerization 2.1 Polymerization Example 1

In a steel autoclave (volume: 150 ml) provided with a mechanical stirrer and electric heating, 500 mg of the solid pulverulent polymerization catalyst 3 were suspended in a mixture of 20 ml of deionized water, 12 ml of a 1% strength by weight solution of tetrafluoroboric acid in deionized water and 1 g of sodium lauryl sulfate (99% by weight pure, Aldrich) under a nitrogen atmosphere. 15 g of propene were added to this suspension at room temperature and the pressure was then set to 50 bar by means of carbon monoxide. After heating to 60° C., the pressure was regulated at 60 bar for a reaction time of 5 hours. The reaction mixture was subsequently cooled to room temperature and the contents of the autoclave were depressurized to atmospheric pressure.

The solid pulverulent polymerization catalyst 3 was separated off from the aqueous polymer dispersion by filtration through a porcelain frit (G3). The residue on the filter was washed with deionized water and dried, giving 490 mg of polymerization catalyst.

40 g of an aqueous copolymer dispersion having a solids content of 23% by weight and a coagulum content of <1% by weight were obtained. The coagulum content was determined by filtration of the aqueous polymer dispersion through a 40 μm filter.

The mean copolymer particle diameter was 250 nm. The melting point was determined as 150° C. The glass transition temperature was 20° C.

The mass average molecular weight was determined by gel permeation chromatography (GPC) as 30 000 g/mol (hexafluoroisopropanol containing 0.05% by weight of potassium trifluoroacetate; calibration was by means of narrow-distribution polymethacrylate standards from PSS having molecular weights of from M=505 to M=2 740 000; elution regions located outside this range were estimated by extrapolation; detection was by means of a differential refractometer HP 1100 from Hewlett Packard).

The aqueous copolymer dispersion was stable and displayed no phase separation, precipitates or coagulum formation over a period of 10 weeks.

The solids content was generally determined by drying about 1 g of the aqueous copolymer dispersion to constant weight in an open aluminum crucible having an internal diameter of about 3 cm in a drying oven at 100° C. and 10 mbar (absolute). To determine the solids content, two separate measurements were carried out in each case and the corresponding mean was calculated.

The mean particle diameter of the copolymer particles was generally determined by dynamic light scattering on a 0.005-0.01 percent strength by weight aqueous dispersion at 23° C. by means of an Autosizer IIC from Malvern Instruments, UK. The value reported is the mean diameter of the cumulated distribution (cumulant z-average) of the measured autocorrelation function (ISO standard 13321).

The determination of the glass transition temperature and the melting point was generally carried out in accordance with DIN 53765 by means of a DSC820 instrument, series TA8000 from Mettler-Toledo.

2.2 Polymerization Example 2

Polymerization example 1 was repeated using only 450 mg of the solid polymerization catalyst residue from polymerization example 1 in place of 500 mg of fresh solid polymerization catalyst 1 and 1-butene instead of propene.

442 mg of the solid polymerization catalyst were recovered by filtration. 39 g of a 20% strength by weight aqueous copolymer dispersion whose copolymer particles had a mean particle size of 220 nm were obtained. The copolymer had a glass transition temperature of 10° C. and a mean molecular weight of 35 000 g/mol.

We claim:

1. A process for preparing an aqueous polymer dispersion, comprising:
   polymerizing at least one olefinically unsaturated compound in an aqueous medium in the presence of at least one dispersant;
   wherein;
   the polymerization is carried out in the presence of a solid polymerization catalyst; and
   the aqueous medium contains an added organic solvent in an amount equal to or less than 1% by weight.

2. The process as claimed in claim 1, wherein the solid polymerization catalyst used is a support material impregnated and/or treated with a homogeneous polymerization catalyst.

3. The process as claimed in claim 2, wherein the homogeneous polymerization catalyst used is a metal complex whose metal center is a metal of group VIIIB, IB or IIB of the Periodic Table.

4. The process as claimed in claim 1, wherein the solid polymerization catalyst is a heterogeneous polymerization catalyst.

5. The process as claimed in claim 1, wherein the polymerization of the olefinically unsaturated compound or compounds is carried out in the presence of carbon monoxide.

6. The process as claimed in claim 2, wherein the solid polymerization catalyst used comprises, after carrying out a polymerization, at least 90% by weight of the homogeneous polymerization catalyst, based on the total amount of the homogeneous polymerization catalyst in the solid polymerization catalyst prior to the polymerization.

7. The process as claimed in claim 1, wherein the solid polymerization catalyst is used in the form of particles whose minimum diameter is at least 10 times the weight average diameter of the polymer particles formed by the polymerization.

8. The process as claimed in claim 7, wherein the solid polymerization catalyst is separated off from the aqueous polymer dispersion formed by filtration or centrifugation.

9. A process for preparing an aqueous polymer dispersion by polymerization of at least one olefinically unsaturated compound in an aqueous medium in the presence of at least one dispersant, wherein the polymerization is carried out in the presence of a solid polymerization catalyst which has been separated off as set forth in claim 8 from an aqueous polymer dispersion.

* * * * *